June 3, 1958 R. M. BOWIE 2,837,734

SURROUND-LIGHTING STRUCTURE

Filed May 29, 1952 2 Sheets-Sheet 1

INVENTOR
ROBERT M. BOWIE
BY John A. Harvey
ATTORNEY

June 3, 1958 R. M. BOWIE 2,837,734

SURROUND-LIGHTING STRUCTURE

Filed May 29, 1952 2 Sheets-Sheet 2

INVENTOR
ROBERT M. BOWIE
BY John Q. Harvey
ATTORNEY

United States Patent Office 2,837,734

Patented June 3, 1958

2,837,734

SURROUND-LIGHTING STRUCTURE

Robert M. Bowie, Manhasset, N. Y., assignor to Sylvania Electric Products Inc., a corporation of Massachusetts Application May 29, 1952, Serial No. 290,735

10 Claims. (Cl. 340—369)

This invention relates to surround-lighting structures for television receivers and more particularly to a surround lighting construction wherein the intensity of the surround lighting automatically and inherently varies in accordance with average picture brightness.

It is generally accepted that surround lighting is beneficial for reducing eye strain and fatigue when viewing images reproduced by a television receiver. Study of the design and function of the human eye indicates that the preferred luminosity of the surround light is related to the average picture brightness. For viewing under optimum conditions of sight, the intensity of the surround light should not exceed the average picture brightness on the one hand or drop materially below it on the other hand, and should preferably maintain a given proportionality with changes of average picture brightness. It is well known that television programming exhibits a wide range of average picture brightness. Control of the intensity of surround lighting in dependence upon the average picture brightness therefore appears desirable for the most effective utilization of surround lighting. Such intensity control should, however, take into account the requirements of simplicity, easy servicing and low cost.

Accordingly, it is an object of the present invention to provide a novel television receiver surround-lighting structure exhibiting one or more of the aforesaid desirable characteristics.

A further object of the present invention is the provision of an exceptionally simple, reliable, and low cost surround lighting structure for the image screen of a picture tube, and one wherein the intensity of the surround lighting inherently varies with the average picture brightness without the requirement of electronic control circuits or the like.

It is another object of the present invention to provide a novel surround-lighting structure for the image-screen of a television receiver in which the intensity of the surround lighting varies not only with the average picture brightness but also, for any given value of picture brightness, decreases in radial directions outward from the image screen thus providing a more gradual transition from the bright screen to its darker surroundings.

The present invention will be best understood by reference to the following detailed description of several illustrative embodiments of the present invention, when taken in conjunction with the accompanying drawings, wherein.

Figure 1:
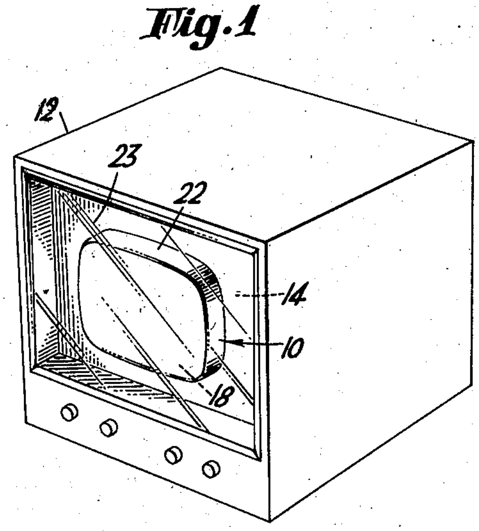
Fig. 1 is a perspective view of one form of surround-lighting structure embodying the present invention as incorporated in a television receiver.

The fovea of the human eye, which is devoted to conscious seeing of detail, covers only a small central region of the total retinal area. This region is commonly referred to as the field of exact vision and is approximately defined as about a one degree angle subtended by the fovea. An object lying wholly within the exact field of vision is designated as the "task" and can be seen distinctly at one time. When viewing an object subtending an angle greater than one degree, the eye without realized effort moves rapidly from one part of the object to another in order successively to bring the entire object into the exact field of vision. Although conscious seeing is limited to the fovea, the remainder of the total retinal area, referred to as the perifoveal region, is of importance when considering the ease of viewing.

There are a number of factors for determining whether the human eye is used under optimum conditions of sight, as for example when viewing television pictures. An important factor is visual acuity, which may be defined as the reciprocal of the just resolvable angle measured in minutes of arc, and is the ability to perceive the interspace between two extremely close objects. This factor is affected both by contrast and intensity of illumination or brightness. Contrast is the ratio of the brightness of the object to its background. Since visual acuity is improved by increasing the illumination up to a certain point, a high ratio of contrast is desirable, keeping in mind that too great a variation in contrast is displeasing to the eye. Brightness is a measure of the illumination of the image of the object formed on the retina of the eye. An increase in brightness favorably influences visual acuity and is advantageous. However, as the brightness increases the stimulation to the eye increases proportionately thus tending to cause more rapid eye fatigue. Further, outside of the fovea of the eye, that is in the perifoveal region of the retina, the eye is more sensitive to low levels of illumination than in the fovea. In fact, a decided decrease in contrast sensitivity is obtained when the perifoveal region is stimulated by too bright a field, a condition usually referred to as "glare." It follows that within the task, contrast is an aid to vision, whereas outside the task, contrast hinders comfortable viewing.

From the foregoing, it is apparent that the intricacies of design and function of the human eye complicate the problem of arriving at optimum values for the various controlling factors in order to minimize eye fatigue and eye strain when observing images reproduced by a television receiver. This problem is further complicated by the interaction that takes place between the foveal and the surrounding perifoveal regions. Reduced to a summary of ultimate result, the interaction process of the perifoveal region tends automatically to move the fovea away from a dark zone toward a brighter zone. For example, in viewing a television picture the fovea normally moves from one area to another to explore the entire picture, but as the fovea approaches the borders of a relatively bright picture having a dark surround the movement of the fovea is counteracted by the interaction process and this causes the viewer unknowingly to tend to return his view to the more comfortably viewable central area of the picture. Thus the viewer unconsciously tends to "stare," resulting in discomfort and eye strain.

Figure 2:
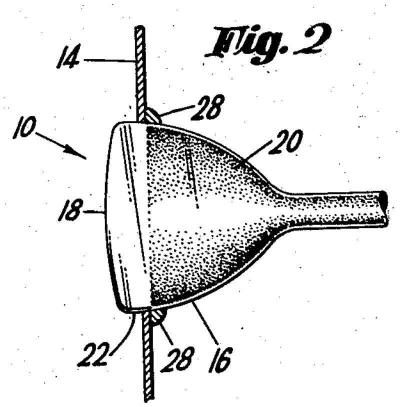
Fig. 2 is a vertical sectional view of the Fig. 1 arrangement.

Referring now to Figs. 1 and 2 of the drawing, there is illustrated a television receiver including a direct-view picture tube 10 which is enclosed within a conventional cabinet 12 having a front wall 14. The latter has an aperture of shape closely conforming to the cross-sectional configuration of the tube 10 to permit the tube to project through the wall 14 as shown. This wall is constructed of any rigid opaque material such as plywood, pressed-fiber board, or the like, and its front surface preferably is matte finished in a light color (such as white or off-white) to serve as a good reflector of light energy. The picture tube is of conventional construction and includes a glass envelope 16 having a fluorescent phosphor-coated image-screen 18, the tube being supported in conventional manner (not shown) but with the screen 18 positioned well forward of the front wall 14. The tube envelope 16 is conventional provided with an opaque internal conductive coating 20 of graphite which terminates a short distance rearwardly of the image-screen 18 to leave a band 22 of transparent glass. It is through this transparent portion of the tube envelope that light from the rear face of the image screen 18 is projected to the front surface of the wall 14. As is well known, the intensity of the fluorescent image produced on the back of the screen 18 is appreciably brighter than that viewed from the front of the tube due largely to light absorption through the material of the screen itself. This condition is even more pronounced when the face plate is tinted with a neutral gray color to enhance contrast in the reproduced image and to minimize the disturbing effect of room light reflected from the image screen.

A transparent safety glass or plastic window 23 is positioned forwardly of the tube 10 and wall 14 to close the front of the cabinet 12. The window 23 may be tinted with a neutral-gray or other color if desired to improve the contrast of the image reproduced by the picture tube 10 and to minimize the effect of reflection of a room light directly to the eyes of the observer. Such reflection may be further minimized or avoided by so mounting the window 23 in the cabinet 12 that it slants slightly forward at the top, thus reflecting any room illumination toward the floor.

A resilient rubber ring or gasket 28 preferably is employed between the wall 14 and the picture tube 10 to seal the compartment formed between the window 23 and wall 14 against the entrance of dust and dirt. A dust-tight seal between the edges of the window 23 and the cabinet 12 is provided for the same purpose.

In operation, the forward surface of the wall 14 is illuminated by the relatively bright image reproduced on the inner or rear face of the phosphor-coated image-screen 18 and projected onto the wall surface through the clear glass 22 of the picture tube 10. This illumination when reflected or diffracted by the wall surface to the observer provides a soft background of lighting which surrounds the image reproduced by the picture tube 10 and against which the image may be viewed. Optimum viewing conditions inherently are maintained since the intensity of this surround lighting never exceeds the average picture brightness and always varies directly in proportion thereto. This tends substantially to minimize eye strain and fatigue. It is apparent that this exceptionally simple and reliable intensity-controlled surround lighting requires no additional electrical components or circuits and is accomplished by a relatively inexpensive arrangement which lends itself well to receiver styling considerations.

Figures 3, 4, 5:
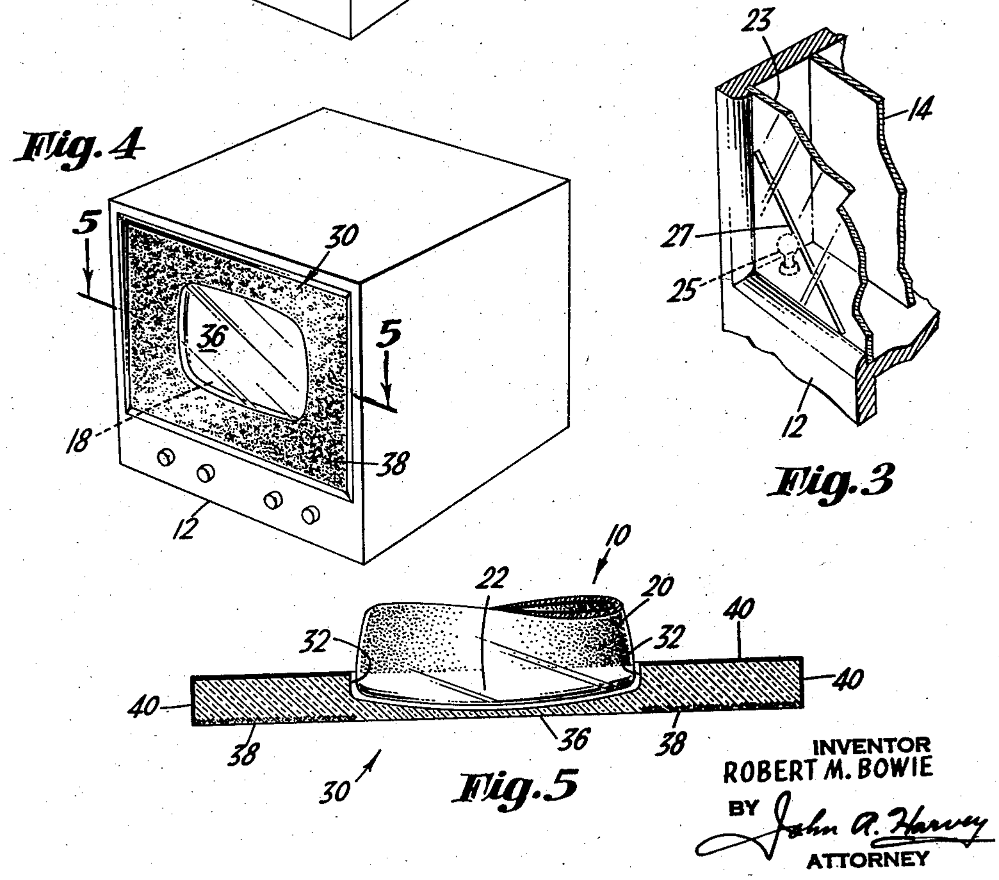
Fig. 3 is a fragmentary view of a construction illustrating modified form of the Figs. 1 and 2 embodiment of the invention.
Fig. 4 is a perspective view of a surround-lighting structure embodying an additionally modified form of the invention.
Fig. 5 is a horizontal sectional view of the Fig. 4 arrangement.

The background illumination provided by the structure of Figs. 1 and 2 may be supplemented, if desired, by low-level constant-intensity illumination in the manner illustrated in Fig. 3. Here a fragmentary view of the lower lefthand corner of the cabinet 12 is shown, and it will be seen that one or more low-wattage incandescent lamps 25 are mounted in each corner of the compartment formed between the wall 14 and window 23, an opaque shield 27 being provided to mask the light of the lamp 25 from direct view. Each of the lamps 25 may be of the low-voltage type energized through a step-down transformer from the 110 volt house-lighting mains, and means may be provided in this energizing circuit for varying the voltage supplied to the lamps to control as desired the level of illumination projected by the lamps 25 onto the cabinet wall 14. Such supplementary illumination may provide white or colored lighting as desired, and its use may be desirable to prevent the surround-lighting intensity from falling below a preselected level. The color of the supplementary illumination may be chosen to conform to, or provide a slight contrast with, the background lighting provided by the picture tube as earlier described.

In Figs. 4 and 5, there is illustrated another surround-lighting structure embodying the present invention in a modified form. This embodiment not only provides intensity-controlled surround lighting, but additionally provides in the same structure the usual safety-glass protection of the picture tube 10. To this end a planar member 30 of transparent material provides the front wall of the cabinet 12, and is formed or molded with a recess 32 arranged centrally thereof and of cross-section slightly larger than but conforming to the cross-section of the forward end of the picture tube 10. The depth of the recess 32 is selected such that a substantial portion of the transparent band 22 of the picture tube 10 is within the recess.

Accordingly, light from the rear face of the screen 18 is transmitted into the member 30 and results in edgewise illumination thereof. That portion 36 of the member 30 opposite the image screen 18 is transparent and provides a protective window through which the image of the picture tube may be viewed, while the remaining area 38 of the front surface of the member 30 is frosted to form a light diffusing mask adjacent to and surrounding the image-screen. In order to direct substantially all of the light entering the member 30 from the picture tube toward the frosted area 38, the rear face and outer edges of the member 30 may be constructed to provide light reflecting surfaces 40 as by silvering. Additionally, an opaque coating may be provided upon the reflecting surface 40 to mask the member 30 from possible stray light originating within the television cabinet.

The member 30 may be constructed of laminated glass or moulded plastic, and may be tinted with a neutral-gray color if desired.

In operation, the light rays emanating from the rear surface of the phosphor-coated image-screen 18 enter the transparent member 30 through the walls of the recess 32 and are directed toward the light diffusing surface 38 by the mirrored surfaces 40. These light rays illuminate the surface 38 and provide a soft background of surround lighting about the image-screen 18 which varies in intensity in accordance with the average picture brightness.

It will be apparent from the foregoing description of the invention that a surround lighting structure embodying the invention is of exceptionally simple, reliable and inexpensive construction yet provides quite effective surround lighting without the addition of any external source of illumination other than that provided by the picture tube itself. Further, the intensity of the resulting surround lighting inherently varies proportionately with average picture brightness without the need for any electrical control components or circuits. The extent of the area of surround illumination may be readily selected as desired and may be easily fitted into the cabinet styling considerations. A surround-lighting structure embodying the invention has the further advantage that the intensity of surround illumination may by suitable construction be arranged to be brightest adjacent the image screen of the picture tube and to decrease gradually in radial directions outwardly therefrom, thus to provide a more gradual transition from the relatively bright screen to its darker surroundings.

Figure 6:
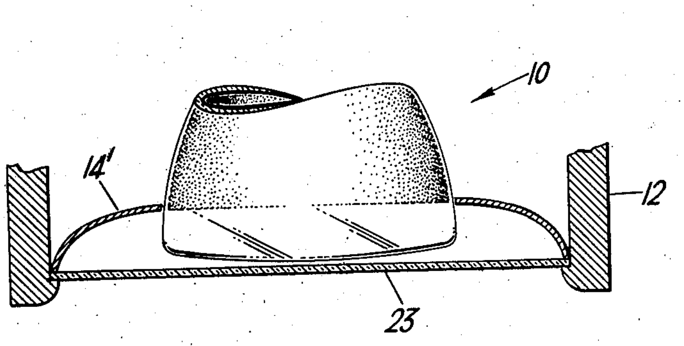
Figs. 6 and 7 are cross-sectional views illustrating modified forms of the respective Figs. 1 and 4 constructions.

Fig. 6 is a cross-sectional view illustrating a modified form of the Figs. 1 and 2 construction, similar elements being designated by similar reference numerals and analogous elements by similar reference numerals primed. In this modified construction, the front wall 14' is given a curvilinear configuration, in particular being concave with respect to the front side of the wall, the curvature extending from the picture tube 10 to the four edges of the window 23. This curvilinear configuration may be desirable for styling considerations, and also may provide a somewhat more rapid decrease of surround-light intensity from the picture tube toward the outer edges of the wall 14'.

Figure 7:
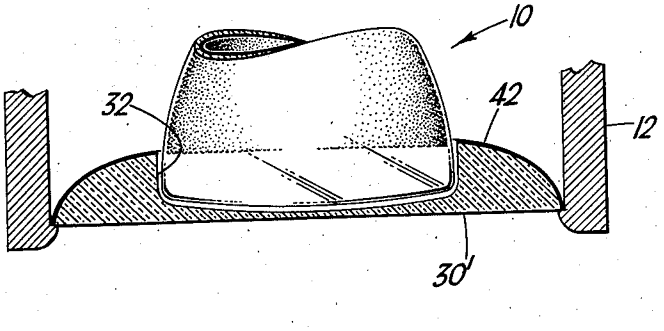

Fig. 7 is a cross-sectional view illustrating a modified form of the Figs. 4 and 5 construction wherein the member 30' has a planar front surface but a curvilinear rear surface which is concave with respect to the front side of the member 30'. In this modification, the curvilinear rear surface of the member 30' is frosted and preferably is covered by a layer 42 of material having good light reflecting properties such as titanium dioxide or other well known white pigment. The front surface of the member 30' may be entirely transparent or also partially frosted as in the Fig. 5 construction.

While there have been described what are at present considered to be the preferred embodiments of the invention, it will be apparent to those skilled in the art that various changes and modifications may be made therein without departing from the invention. Consequently, the appended claims should be interpreted broadly, as may be consistent with the spirit and scope of the invention.

What I claim is:

1. A surround-lighting structure comprising a member having at least one apertured surface to surround and receive forwardly of said surface the image screen of an image reproducing device, said image reproducing device including a light transparent portion adjacent the image screen thereof so that said screen is viewable from both the front and rear sides thereof, said surface having light reflecting properties to direct light incident on said surface from the rear side of said screen forwardly to an observer as surround lighting for said screen.

2. A surround-lighting structure comprising a member having at least one surface apertured to surround and receive forwardly of said surface the image screen of an image reproducing device, said image reproducing device including a light transparent portion adjacent the image screen thereof so that said screen is viewable from both the front and rear sides thereof, said aperture of said surface having a cross section conforming closely to that of said device and said surface having light reflecting properties to direct light on said surface from the rear side of said screen forwardly to an observer as surround lighting for said screen.

3. A surround-lighting structure comprising a member apertured to surround and receive forwardly of one face thereof the image screen of an image reproducing device, said image reproducing device including a light transparent portion adjacent the image screen thereof so that said screen is viewable from both the front and rear sides thereof, said face having light reflecting properties to direct light incident on said face from the rear side of said screen forwardly to an observer as surround lighting for said screen.

4. A surround-lighting structure comprising a member of opaque material apertured to surround and receive forwardly of one surface thereof the image screen of an image reproducing device, said image reproducing device including a light transparent portion adjacent the image screen thereof so that said screen is viewable from both the front and rear sides thereof, said surface having light reflecting properties to direct light incident on said surface from the rear side of said screen forwardly to an observer as surround lighting for said screen.

5. A surround-lighting structure comprising a rigid, opaque panel having an aperture closely conforming in cross-section to that of an image reproducing device received in said aperture and positioned with the image screen of said device forward of the front surface of said panel, said device including a light transparent portion adjacent the image screen thereof so that said screen is viewable both from the rear and front sides thereof, and said surface of said panel having good light reflecting properties to direct light incident on said surface from the rear side of said screen forwardly to an observer as surround lighting for said screen.

6. A surround-lighting structure for the image screen of a direct-view television picture tube which includes a light transparent portion adjacent the image screen thereof so that said screen is viewable both from the front and rear sides thereof, comprising a light diffracting member adapted to surround said picture tube and to be positioned normal to the axis of said tube but sufficiently behind the image screen thereof as to be illuminated by light emanating from the rear surface of said screen to thereby provide surround lighting immediately adjacent to said image screen.

7. A surround-lighting structure comprising a generally planar transparent member having a recess to receive forwardly of the rear surface of said member the image screen of an image reproducing device, said image reproducing device including a light transparent portion adjacent the image screen thereof so that said screen is viewable from both the front and rear sides thereof, the surface on one side of said member being frosted for good light diffracting properties except for a transparent area in opposing relation to said image screen and the rear surface of said member having good light reflecting properties to direct light incident on said rear surface from the rear side of said screen forwardly to an observer as surround lighting for said screen.

8. A surround-lighting structure comprising a generally planar member having at least one apertured surface to surround and receive forwardly of said surface the image screen of an image reproducing device, said image reproducing device including a light transparent portion adjacent the image screen thereof so that said screen is viewable from both the front and rear sides thereof, said surface having light reflecting properties to direct light incident on said surface from the rear side of said screen forwardly to an observer as surround lighting for said screen.

9. A surround-lighting structure comprising a member having at least one apertured surface to surround and receive forwardly of said surface the image screen of an image reproducing device, said image reproducing device including a light transparent portion adjacent the image screen thereof so that said screen is viewable from both the front and rear sides thereof, said surface being of curvilinear configuration and having light reflecting properties to direct light incident on said surface from the rear side of said screen forwardly to an observer as surround lighting for said screen.

10. A surround-lighting structure comprising a member having at least one apertured surface to surround and receive forwardly of said surface the image screen of an image reproducing device, said image reproducing device including a light transparent portion adjacent the image screen thereof so that said screen is viewable from both the front and rear sides thereof, said surface being concave with respect to the front side of said member and having light reflecting properties to direct light incident on said surface from the rear side of said screen forwardly to an observer as surround lighting for said screen.

(References on following page)

References Cited in the file of this patent

UNITED STATES PATENTS

| | | |
|---|---|---|
| 2,117,857 | Schlanger et al. | May 17, 1938 |
| 2,298,870 | Cooper | Oct. 13, 1942 |
| 2,598,072 | Rose | May 27, 1952 |
| 2,665,419 | Van Orden | Jan. 9, 1954 |

FOREIGN PATENTS

| | | |
|---|---|---|
| 445,978 | Great Britain | Apr. 22, 1936 |
| 460,508 | Great Britain | Jan. 28, 1937 |
| 926,553 | France | Oct. 6, 1947 |

OTHER REFERENCES

Bedford Abstract 83,652, Feb. 20, 1951.